United States Patent
Matthews et al.

(10) Patent No.: US 8,503,456 B2
(45) Date of Patent: Aug. 6, 2013

(54) FLOW BASED PATH SELECTION RANDOMIZATION

(75) Inventors: Brad Matthews, San Jose, CA (US); Puneet Agarwal, Cupertino, CA (US)

(73) Assignee: Broadcom Corporation, Irvine, CA (US)

( * ) Notice: Subject to any disclaimer, the term of this patent is extended or adjusted under 35 U.S.C. 154(b) by 666 days.

(21) Appl. No.: 12/756,636

(22) Filed: Apr. 8, 2010

(65) Prior Publication Data

US 2011/0013627 A1 Jan. 20, 2011

Related U.S. Application Data

(60) Provisional application No. 61/225,538, filed on Jul. 14, 2009, provisional application No. 61/225,540, filed on Jul. 14, 2009, provisional application No. 61/225,541, filed on Jul. 14, 2009.

(51) Int. Cl.
*H04L 12/28* (2006.01)

(52) U.S. Cl.
USPC .............. 370/395.32; 370/351; 370/389

(58) Field of Classification Search
None
See application file for complete search history.

(56) References Cited

U.S. PATENT DOCUMENTS

| | | | |
|---|---|---|---|
| 6,081,522 A * | 6/2000 | Hendel et al. | 370/389 |
| 6,173,384 B1 * | 1/2001 | Weaver | 711/216 |
| 6,249,521 B1 * | 6/2001 | Kerstein | 370/389 |
| 6,625,146 B1 * | 9/2003 | Merchant et al. | 370/389 |
| 6,687,375 B1 * | 2/2004 | Matyas et al. | 380/45 |
| 6,807,179 B1 * | 10/2004 | Kanuri et al. | 370/395.31 |
| 6,862,602 B2 * | 3/2005 | Guha | 1/1 |
| 6,980,521 B1 | 12/2005 | Jarvis | |
| 7,002,960 B1 * | 2/2006 | Golan et al. | 370/393 |
| 7,206,861 B1 * | 4/2007 | Callon | 709/242 |
| 7,212,526 B2 | 5/2007 | Kanetake | 370/386 |
| 7,225,219 B2 * | 5/2007 | Giacomini et al. | 709/200 |
| 7,248,585 B2 * | 7/2007 | Kohn et al. | 370/392 |
| 7,327,748 B2 * | 2/2008 | Montalvo et al. | 370/412 |
| 7,349,397 B2 * | 3/2008 | Davis et al. | 370/392 |
| 7,403,527 B2 * | 7/2008 | Davis et al. | 370/392 |
| 7,408,930 B2 * | 8/2008 | Pathi et al. | 370/389 |
| 7,436,830 B2 * | 10/2008 | Ben-Nun et al. | 370/389 |
| 7,451,209 B1 * | 11/2008 | Schieber et al. | 709/224 |
| 7,600,094 B1 * | 10/2009 | Jin et al. | 711/216 |
| 7,633,871 B1 * | 12/2009 | Callon | 370/235 |
| 7,640,595 B2 * | 12/2009 | Chojnacki | 726/30 |
| 7,707,136 B2 * | 4/2010 | Vosshall et al. | 707/695 |

(Continued)

OTHER PUBLICATIONS

Martin, Ruediger. "Accuracy and Dynamics of Hash-Based Load Balancing Algorithms for Multipath Internet Routing", IEEE 2006.*

*Primary Examiner* — Ayaz Sheikh
*Assistant Examiner* — Faiyazkhan Ghafoerkhan
(74) *Attorney, Agent, or Firm* — McDermott Will & Emery LLP

(57) ABSTRACT

Methods and apparatus for randomizing selection of a next-hop path/link in a network are disclosed. An example method includes receiving, at the network device, a data packet. The example method further includes generating a first hash key based on the data packet and generating a first hash value from the first hash key using a first hash function. The example method also includes generating a second hash key based on the data packet and the first hash value and generating a second hash value from the second hash key using a second hash function. The example method still further includes selecting a next-hop path based on the second hash value.

18 Claims, 10 Drawing Sheets

U.S. PATENT DOCUMENTS

| | | | |
|---|---|---|---|
| 7,821,925 B2 * | 10/2010 | Davies | 370/229 |
| 7,912,896 B2 * | 3/2011 | Wolovitz et al. | 709/203 |
| 7,984,183 B2 * | 7/2011 | Andersen et al. | 709/244 |
| 7,995,595 B1 * | 8/2011 | Mogul | 370/403 |
| 8,176,338 B1 | 5/2012 | Stringham | |
| 8,244,909 B1 * | 8/2012 | Hanson et al. | 709/238 |
| 8,285,881 B2 * | 10/2012 | Elzur | 709/250 |
| 8,295,286 B2 | 10/2012 | Rajgopal et al. | |
| 2002/0094084 A1 * | 7/2002 | Wasilewski et al. | 380/241 |
| 2003/0137978 A1 * | 7/2003 | Kanetake | 370/386 |
| 2003/0147385 A1 * | 8/2003 | Montalvo et al. | 370/389 |
| 2004/0199535 A1 * | 10/2004 | Zuk | 707/102 |
| 2005/0125424 A1 * | 6/2005 | Herriott et al. | 707/100 |
| 2005/0232270 A1 * | 10/2005 | Bass et al. | 370/389 |
| 2005/0254502 A1 * | 11/2005 | Choi | 370/395.32 |
| 2006/0122989 A1 * | 6/2006 | Kurupati et al. | 707/3 |
| 2006/0248079 A1 * | 11/2006 | Braica | 707/7 |
| 2006/0265363 A1 * | 11/2006 | Calvignac et al. | 707/3 |
| 2007/0157028 A1 * | 7/2007 | Lott | 713/182 |
| 2007/0168377 A1 * | 7/2007 | Zabarsky | 707/102 |
| 2007/0234005 A1 * | 10/2007 | Erlingsson et al. | 711/216 |
| 2007/0286194 A1 * | 12/2007 | Shavitt et al. | 370/392 |
| 2008/0037544 A1 | 2/2008 | Yano et al. | |
| 2008/0181103 A1 * | 7/2008 | Davies | 370/230 |
| 2008/0256362 A1 | 10/2008 | Takenaka et al. | |
| 2008/0260147 A1 * | 10/2008 | Shin et al. | 380/46 |
| 2008/0263354 A1 | 10/2008 | Beuque et al. | |
| 2009/0287846 A1 * | 11/2009 | Iyengar et al. | 709/242 |
| 2010/0076930 A1 * | 3/2010 | Vosshall et al. | 707/638 |
| 2010/0293373 A1 * | 11/2010 | McBrearty et al. | 713/168 |
| 2010/0332451 A1 * | 12/2010 | Vosshall et al. | 707/634 |

* cited by examiner

FLOW BASED PATH SELECTION RANDOMIZATION

CROSS REFERENCE TO RELATED APPLICATIONS

This application claims the benefit, under 35 U.S.C. §119, of U.S. Provisional Patent Application No. 61/225,538, U.S. Provisional Patent Application No. 61/225,540 and U.S. Provisional Patent Application No. 61/225,541, all filed Jul. 14, 2009. The disclosures of these provisional patent applications are incorporated herein by reference in their entirety.

TECHNICAL FIELD

This description relates to data and network communications.

BACKGROUND

Network devices and data networks that process and communicate data traffic often implement multiple paths across which data traffic may be communicated In certain applications multiple paths, such as multiple paths between a single source and single destination, may be grouped together (e.g., as a logical trunk or an aggregation group). In such applications, the network devices (nodes) communicating network data traffic (e.g., data packets) may use load balancing techniques to distribute the data traffic across the links included in an aggregation group. One such technique is the use of hash-based load balancing.

To perform such hash-based load balancing across a set of aggregates, a common approach is to hash a set of packet fields to resolve which among a set of possible route choices to select (e.g., which member of an aggregate). At every hop in the network, each node may have more than one possible next-hop/link that will lead to the same destination. For purposes of this disclosure, a node may be viewed as any level of granularity in a data network. For instance a node could be an incoming data port, a combination of the incoming data port and an aggregation group, a network device, a packet switch, or may be some other level of granularity.

In a network or network device, each node would select a next-hop/link based on a hash of a set of packet fields which do not change for the duration of a flow. A flow may be defined by a number of different parameters, such as source and destination addresses (e.g., IP addresses or MAC addresses), TCP flow parameters, or any set of parameters that are common to a given set of data traffic. Using such an approach, packets within a flow, or set of flows that produce the same hash value, will follow the same path at every hop. This approach leads to poor distribution of multiple flows to aggregate members and causes starvation of nodes, particularly in large multi-hop, multi-path networks (e.g., certain nodes in a multi-hop network may not receive any data traffic), especially as you move further away from the node (called root node) at which the traffic entered the network.

SUMMARY

A method and/or apparatus for path selection for data traffic, as set forth more completely in the claims.

DETAILED DESCRIPTION

I. Multi-Hop Multi-Path Networks

Figure 1:
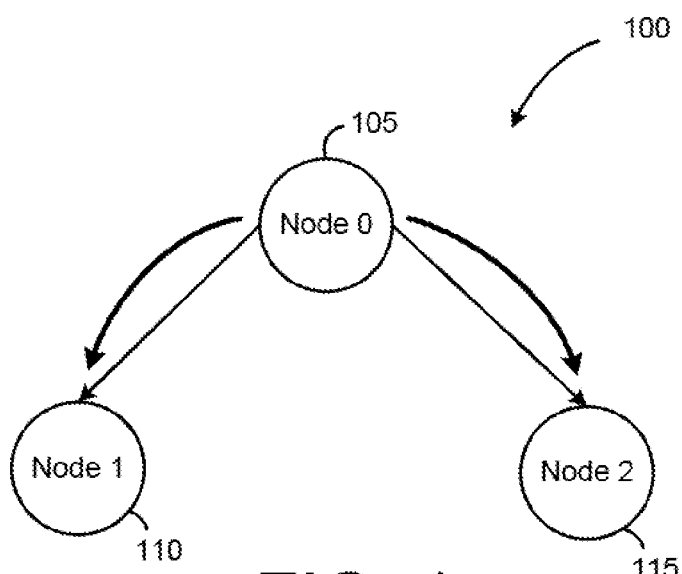
FIG. 1 is a block diagram illustrating a single-hop of a multi-path network in accordance with an example embodiment.

FIG. 1 is block diagram illustrating a single-hop of a multi-path network 100 (network 100) in accordance with an example embodiment. The network 100 includes three nodes, Node0 105, Node1 110 and Node2 115. In the network 100, data traffic (e.g., data packets) may enter the network 100 via Node 105. Depending on the data traffic, the Node0 105, after receiving the data traffic, may then select a next-hop/link for the data traffic. In this example, the Node0 105 may decide to send certain data packets to the Node1 110 and send other data packets to the Node2 115. These data packets may include data information, voice information, video information or any other type of information.

In a multi-path network, the Node1 110 and the Node2 115 may be connected to other nodes in such a fashion that data traffic sent to either node can arrive at the same destination. In such approaches, the process of binding a flow (such as discussed above) to a next-hop/link may begin by extracting a subset of static fields in a packet header (e.g., Source IP, Destination IP, etc.) to form a hash key. Typically, the hash key is fixed for a single flow and does not change for packets within the flow. If the hash key were to change for packets within a flow, a fixed binding of a flow to a next-hop/link would not be guaranteed and re-ordering of packets in that flow may occur at one or more nodes of such a network. This packet re-ordering could lead to degraded performance for some communication protocols (e.g., TCP).

In such hash based path selection approaches, the hash key may serve as an input to a hash function, commonly a CRC16 variant or CRC32 variant, which produces, respectively, a 16-bit or 32-bit hash value. Typically, only a subset of the hash value bits is used by a given application (e.g., Trunking, link aggregation groups (LAGs) and equal cost multi-path (ECMP), herein, collectively, aggregation group(s)). Unused bits of the hash value are masked out and only the masked hash value is used to bind a flow to one of the N aggregate members, where N is the number of links that belong to a given aggregation group.

The list of N aggregate members may be maintained in a destination mapping table for a given aggregate. Examples of such destination mapping tables is discussed in further detail below with respect to FIG. 4a. Each table entry contains forwarding information indicating a path to the packet destination. An index into this table (a destination table index) may be calculated as the remainder of the masked hash value modulo N (the number of aggregate group members), such as the one shown below by Equation 1.

destination table index=masked_hash_value mod N          Equation 1

Using the destination table index, the node may determine the next-hop/link destination (aggregate member) for each packet. This process clearly binds a flow or set of flows producing the same destination table index to a single aggregate member using a mathematical transformation that will always select the same aggregate member for a given hash key. As discussed in further detail below, the path selection randomization techniques described herein may be used to make such next-hop/link selections that also bind a given flow to a specific aggregate member, but achieve better distribution of data traffic across possible next-hops/link available at a given node.

As discussed above, the network 100 is a single-hop network (depth=1 with two layers) that may be part of a larger multi-hop, multi-path network that performs forwarding for flows going to the same or different destinations. As previously indicated, all data traffic that is communicated in the network 100 traffic may enter the network 100 via a single node (called root node), in this case, the Node0 105. For purposes of this example, it will be assumed that all flows can reach any destination of a larger network of which the network 100 is a part of using any leaf of an N-ary tree rooted at the Node0 105. In such a network, each flow originating at the Node0 105 will pick one member (of the N=2 aggregate members) to send the flow on its way to its destination using a hashing function. If each flow has a unique hash key that is reasonably random as compared to other flows, and the hash function distributes hash-values equally over the hash values 16-bit space, then flows arriving to the Node0 105 will be distributed evenly to each of its two child nodes, Node1 110 and Node2 115 (e.g., approximately fifty percent of the flows to each of Node1 100 and Node2 115.

In this example, the network 100 is effectively a binary tree, and flows would be distributed from the root node (Node0 105) to the two child nodes (Node1 110 and Node2 115). Given these conditions, flows are evenly distributed because there is only a single hop. Therefore, in this example, neither Node1 110 or Node2 115 will receive a disproportionate number of flows and, accordingly, there are no starved leaf nodes (i.e. leaf nodes that receive no traffic).

Figure 2:
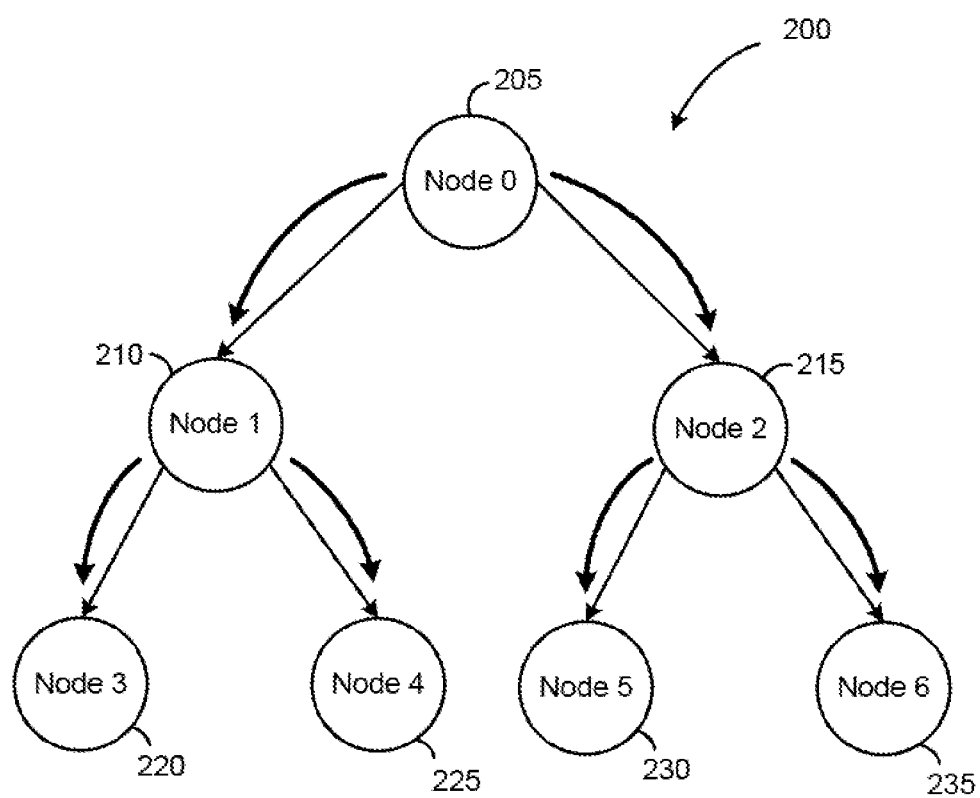
FIG. 2 is a block diagram illustrating two hops of a multi-path network in accordance with an example embodiment.

FIG. 2 is a block diagram illustrating two hops of a multi-path network 200 in accordance with an example embodiment. As with the network 100 discussed above, the network 200 may be part of a larger multi-hop, multi-path network that performs forwarding for flows going to same or different destinations. Also in like fashion as discussed above with respect to the network 100, all data traffic that is communicated in the network 200 may enter the network 200 via a single node (called root node), in this case, the Node0 205. For purposes of this example, it will be assumed that all flows can reach any destination of a larger network of which the network 200 may be a part of using any leaf of an N-ary tree (e.g., the larger network) rooted at the Node0 205.

By extending the depth of the network 100 to 2 and the number of layers to 3 (as compared with the network 100), both the Node1 205 and Node2 210 will then have two children each. The Node1 205 will have children Node3 220 and Node4 225, as shown in FIG. 2. Similarly, Node2 215 will have children Node5 230 and Node6 235.

In the network 200, if the same approach is used to determine hash keys and the same hash function is used for all nodes, an issue arises at the second layer of the network 200 as flows are received at Node1 210 and Node2 215. In this situation, each packet arriving at Node1 210 will yield the same hash key as Node0 205, when operating on the same subset of packet fields (which is a common approach). Given the same hash function (e.g., a CRC16 hash function) and number of children, the result of the hashing process at Node0 205 will be replicated at Node1 210. Consequently, all flows that arrive at Node1 210 will be sent to Node3 220 as these are the same flows that went "left" at Node0 205. Because, in this arrangement, the same mathematical transformation (hash function) is performed on the same inputs (hash keys) at each node in the network, the next-hop/link selected by the hash algorithm remains unchanged at each hop. Thus, the next-hop/link selection between two or more nodes in the flow path (e.g., Node0 205 and Node1 210) is highly correlated, which may lead to significant imbalance among nodes.

For a binary tree with a depth of 2 hops (three layers), the consequence of this approach is that all flows that went "left" at the Node0 205 and arrived at the Node1 210 (e.g., all flows arriving at the Node1 210 from Node0 205), will again go "left" at Node1 210 and arrive at Node3 220. As a result, Node4 225 will not receive any data traffic, thus leaving it starved. Similarly, all traffic sent to the Node2 215 will be propagated "right" to the Node6 235, thereby starving the Node5 230. As the depth of such a network increases, this problem is exacerbated given that the number of leaf nodes increases (e.g., exponentially), but only two nodes at each level will receive data traffic. By using the path selection randomization techniques described herein, data traffic flow distribution may be balanced at each node (hop), such that flow imbalances and the number of starved leaf nodes are reduced.

II. Example Switching Element

Figure 3:
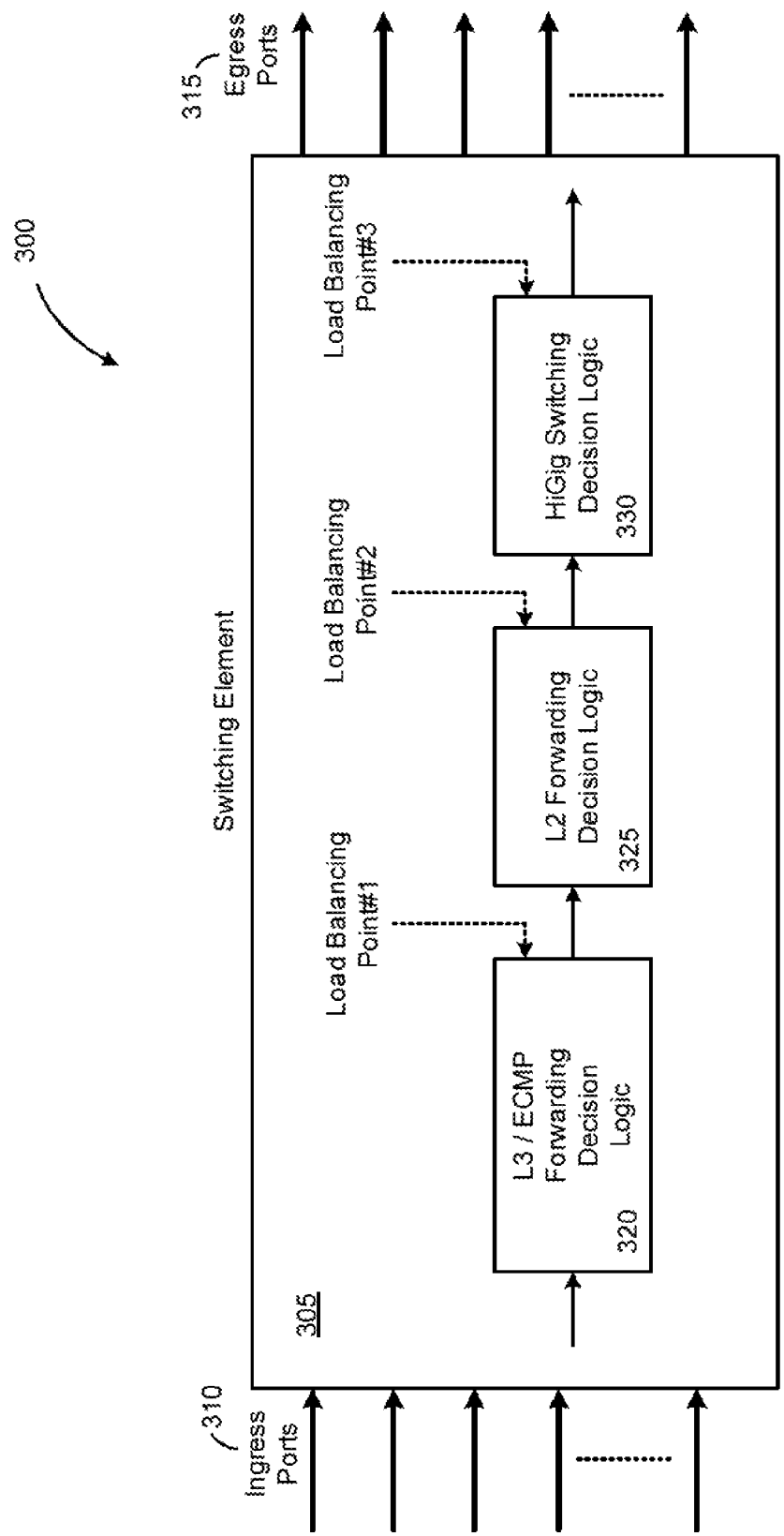
FIG. 3 is block diagram illustrating a switching element in accordance with an example embodiment.

FIG. 3 is block diagram illustrating a switching element 300 in accordance with an example embodiment. The switching element 300 may be used to implement the techniques for path selection randomization described herein. Also, other switching elements (e.g. switches, routers, packet processors, etc.) that perform forwarding or switching decisions for an aggregation group may be used to implement these techniques.

In the switching element 300, the forwarding/switching decisions made for packets received via ingress ports 310 could be to select a next-hop (such as in the L3/ECMP forwarding decision logic 320 or the L2/ECMP forwarding decision logic 325) to which a packet should depart via the egress ports 315. Likewise, forwarding/switching decision made for the packets received via ingress ports 310 may be to select a next link (such as a LAG or HiGig link (e.g., using the HiGig switching decision logic 330)) to which a packet should depart via the egress ports 315. In fact, multiple load balancing decisions may be performed in series, such as depicted in FIG. 3. The path selection techniques described herein may be used, alone or in combination, for each forwarding or switching decision in a network in order to improve data traffic distribution across members of an aggregation group and the network as a whole.

One advantage of the approaches described herein (e.g., when applied in a switching element 300 implemented in a multi-hop multi-path network) is that starvation of leaf nodes can be significantly reduced, if not eliminated, thus improving network utilization. Another advantage of using such techniques (e.g., in the switching element 300 or other network device) is that, the distribution of flows for a wide range of network topologies may be improved when compared to a given network using the same hash key/hash function configuration for all nodes. Yet another advantage of the techniques described herein, is that these techniques are network topology independent, and may be implemented in a wide range of network topologies including networks within a network (e.g., where each node may operate as a network itself) to improve data traffic distribution and network efficiency.

Yet another advantage of the techniques described herein, as has been previously mentioned, is that nodes of a network (such as a multi-hop multi-path network) can utilize any, or all, of the mechanisms presented in this disclosure simultaneously to achieve performance gains. Independent configuration of the nodes of a network in accordance with the approaches for path selection randomization described herein enables each node of the network to perform different mathematical transformations at each node, or hop, (e.g., as compared to a previous node, or hop) such that the output result in one node is much less likely to be repeated (except as consistent with random probability) in the next or subsequent hops on the way to the destination.

While any, or all, of the techniques described herein may be utilized by a single node at the same time, attributes of the particular network in which the techniques are being applied may need to be considered in order to tune network performance. Therefore, certain techniques may be disabled or eliminated in some networks. In general, however, implementing each of the techniques describe herein may provide an incremental improvement in performance for a wide range of network topologies and data traffic scenarios.

For purpose of clarity and illustration, the following discussion of techniques for path selection randomization are discussed in the context of a multi-hop multi-path network (e.g., Trunking, LAG, ECMP, etc.). It will be appreciated, however, that these techniques may be applied in other network topologies in order to improve distribution of data flows across nodes of the network and, therefore, also improve network utilization. Also, for purposes of clarity and illustration, the techniques discussed herein may, in some instances, be described as being implemented together and, in other instances, described as being implemented independently. However, it will be appreciated that each of the techniques described herein may be implemented simultaneously or may be implemented separately. Accordingly, the approaches described herein are not limited to being implemented alone or in any particular combination.

III. Node Based Path Selection Randomization

In order to improve path selection randomization between nodes of a multi-hop multi-path network, it would is desirable to have every node of a network perform a unique mathematical transformation on a unique hash key, so that the result of each unique mathematical transformation has no correlation with the result of the mathematical transformations from all other nodes in the path of the flow from the root node to the leaf nodes of an N-ary tree network.

The following discussion discusses a number of techniques that, when enabled simultaneously, may significantly increase path selection randomness at each node as compared to use of the same mathematical transformation at each node. These techniques include techniques for manipulating the hash key, hash function, hash output value, and destination mapping table in a manner that does not lead to packet re-ordering.

When implementing these techniques, each node can configure logic entities of the node independently of all other nodes in the system. For instance, each node may implement logic entities (e.g., using machine readable instructions) that allow a hash key, a hash function, a hash output value, and/or attributes of a destination mapping table to be manipulated in a configurable manner.

Enabling these features reduces correlation between the forwarding nodes in a multi-hop multi-path network for next-hop/link (path) selection for different flows. In doing so, imbalance may be reduced and node starvation, in a multi-hop network, may also be reduced.

a. Hash Key Seed and Bit Masking

One technique that may be used to increase path selection randomization in a data network is for each node to randomly select operations for modifying a hash key before the hash key is used by a hash function logic entity to determine a hash value. As part of the network configuration process, the randomly selected operations for each node may be analyzed and the techniques for one or more nodes may be modified in order to further reduce correlation between the nodes and increase randomness. One of more of a number of various possible operations for modifying hash keys may selected by a node during an initialization of the nodes In the example techniques discussed herein, the techniques that may be randomly selected for use at each node are techniques for modifying a hash key that is generated from fixed fields of a packet. By randomly selecting one or more operation for modifying a hash seed (and then applying those options to each packet processed by a node) packet order may be preserved, because, for each node, the process of generating and modifying hash seeds remains consistent throughout the duration of a data traffic flow.

One option for modifying a hash seed generated from a packet is to prepend, append or interleave a finite-sized seed value with the hash key before passing it to the hash function for calculation of the hash value. The seed selected by each node may be of an arbitrary size. In order to improve path selection randomness but maintain packet order, each node in a network may be configured to have a different seed, but a given node can not change its seed while it is actively transmitting packets. If a node was to change its seed while actively transmitting packets, it is likely the path selection decision for a given flow would change and, as a result, packets for flows being processed by the network may arrive at their destination out-of-order. In this situation, reordering of the packets may be needed. Such reordering may adversely affect network performance.

Another option for improving path selection randomness by modifying a hash seed is to mask selected hash key fields (bits) with a mask using one or more logical "mask operations" using a mask value to produce a modified hash key. Such operations may include XORing the hash seed with the selected mask value, ANDing the hash key with the selected mask value, ORing the hash key with selected mask value, and inverting (using a logical NOT operation) the hash seed. Of course, other operation for masking a hash seed to produce a modified hash seed may be used. Thus, each node of a network may select a different seed to append/prepend to, and/or interleave (using logical operations) with, a hash key produced using fixed packet fields or other fixed parameters associated with the packets. The selected seed remains fixed for all flows for a given node, even though each node may utilize different seeds.

Also, hash key fields may be optionally masked using any bitwise operation (XOR, AND, OR, etc.) with a randomly chosen per node mask, as well as a randomly chosen per node masking operation. In order to preserve packet ordering, the mask and the masking operation would be selected at initialization time for a given node and not changed while the node is transmitting data packets, so that the same mask and masking operation is applied to all packets in a given flow. However, multiple nodes should use different masks and masking operations in order to increase path selection randomness.

Accordingly, when using such techniques, each node should randomly select a unique seed, mask and masking operation at configuration time. Once configured, the seed and mask must remain fixed throughout the duration of operation. By incorporating a seed with a hash key and masking the hash key with a mask operation reduces the correlation in next-hop/link selection for successive hops, which leads to reduced imbalance in path selection and, therefore, better distribution of data traffic to leaf nodes in a multi-hop multi-path network.

b. Hash Function Selection

Once the hash key is generated and modified using one or more modification operations, such as those discussed above, the modified hash key may be provided as an input to a hash function. A logical entity in a network node that is used to implement the hash function may receive the modified hash key and calculate the hash value using a selected hash function for the node. Each node may randomly select the hash function that it uses to determine hash values from modified hash keys. The hash function implemented by a given node may one of a CRC16 hash function, a CRC32 hash function, a Pearson's hash function or an XOR hash function. Of course, a given node may have other hash functions to select from and may implement a number of other hash functions instead of the examples listed above.

In order to increase path selection randomness, it would be desirable to have each node use a unique hash function, as such an approach would significantly minimize correlation in the next-hop/link selection. However, in certain embodiments, such an approach may impractical. Network devices (nodes) that implement hash function path selection may only provide a small set of hash functions to select from.

As with the hash key modification operations discussed above, the hash function implemented by a given node should be chosen at random from those available during configuration, but remain fixed while the node is transmitting packets in order to preserve packet ordering. By randomly selecting which of a set of available hash functions to use at each node of a network, after successive hops of data packet, where the hash function at each node is different, the correlation between path selection for a given flow at each node is reduced and flows should be evenly distributed as they traverse down the network tree. Again, this approach leads to increased path selection randomness and balanced distribution of flows to the leaf nodes.

c. Hash Value Bit Selection

By applying a selected hash function implemented at a given node to a modified hash key produced by the node, a finite-sized (typically) 16-bit or 32-bit hash value is produced. This hash value may be used for use by load balancing applications (e.g. Trunking, LAGs, and ECMPs), including next-hop/link selection. For instance, the hash value may be used to compute a destination table index, such as previously described and discussed in further detail below. For implementation reasons in certain embodiments, only a subset (k) bits of the hash value may be used to compute the destination table index. The k bits used to compute the destination table index may also be referred to as a selected hash value.

For instance, a given network node may utilize only 8 bits of a 16-bit hash value to resolve a destination table index. Consequently, in such an approach, some number of hash value bits, in this case 8-bits, go unused by the given node. To reduce correlation of next-hop/link output values among nodes, an individual node may be configured to select a set of k bits at random (which are randomly determined at initialization) from the hash values generated by the node to resolve destination table indices for the given node. Different nodes in a network can select a different random set of k bits from the hash value. In order to preserve packet ordering, the set of k bits used for a given node should remain fixed while the node is transmitting packets. This increased randomness reduces imbalance at each node in the network and improves flow distribution to leaf nodes. In order to further increase randomness, each node may choose to use a random value for k. Thus, a given node may select a different number of bits than other nodes to generate selected hash values.

d. Destination Mapping Table Shuffling and Entry Replication

After a hash value is generated and a selected hash value is determined from the hash value, such as in the fashions discussed above, a next-hop/link selection for an associated data packet may be determined by computing an index into a Destination Mapping Table (e.g., a destination mapping index) and then indexing the destination mapping table with the computed index. In an example embodiment, a destination mapping index may be the remainder of the selected hash value modulo N, where N is the number of members in a given aggregation group. Randomization of the destination mapping table index and subsequent next-hop/link selection may be achieved by determining the selected hash value used to determine the destination mapping table index in the manner discussed above.

In order to further increase path selection randomization, entry replication may be used for entries in a destination mapping table, such as discussed further below with respect to FIGS. 4b and 4c. Using such an approach, each entry in a given destination mapping table may be replicated by a factor "rf." The rf factor may be selected randomly by each node in a network for each associated aggregate that is available as a next-hop/link. The rf factors should be selected by the nodes during initialization and should remain fixed for a given node while the given node is transmitting packets, or until changes are required to the aggregate's membership, so as to preserve packet ordering. Using entry replication alters the definition of the destination mapping table index to the calculation shown by Equation 2 below:

Destination Mapping Table Index=selected hash value modulo ($rf*N$)     Equation 2

Using such an approach, each next hop/link that may be selected by a given node will appear rf times in an associated destination mapping table. For example, a node with four child nodes that may be selected as a next-hop/link, where the node is using a replication factor of 4 will have 16 entries in its destination mapping table (e.g., with indices of 0-15) and each child node will be associated with 4 of the 16 indices.

In addition to replicating table entries, entries in a destination mapping table may be shuffled to further increase path selection randomization. In a network that uses entry shuffling, the order in which next-hops/links appear in the destination mapping table for a given node is randomized by the given node. Such shuffling should be performed at configuration and should remain fixed throughout the duration of operation or until changes are required to the aggregate's membership, so as to preserve packet ordering.

Such entry shuffling modifies the next-hop/link selection sequence. The modulo operator splits the range of values provided by the selected hash value into rf*N distinct sets of numbers. With shuffling, rf random indices map to the same next-hop/link at any node. If any two nodes (say node-x and node-y) that are in the path of a set of flows have the same configuration of other parameters and shuffling is not performed, and the flows traverse node-x before they traverse node-y, all flows that mapped to the same next-hop/link at node-x will also map to one next-hop/link at node-y. Such a result leads to poor flow distribution at node-y and may result in disproportionate distribution of data traffic. By using replication and shuffling, the probability of this occurrence is reduced.

While shuffling can be implemented without the use of replication, using replication in combination with shuffling allows for an increased number of possible shuffling permutations. For instance, each aggregation group for a given node can be configured using a unique replication factor. As the replication factor increases for a given node, the range of values provided by computing hash value modulo N will provide rf*N distinct sets of numbers. Each set can be mapped to a single next-hop/link randomly (a.k.a., shuffling) at configuration time. This reduces the correlation among next-hop/link sequences produced at each node, which serves to reduce imbalance and starvation in a multi-hop network.

e. Example Destination Mapping Tables

Figures 4A, 4B, 4C:
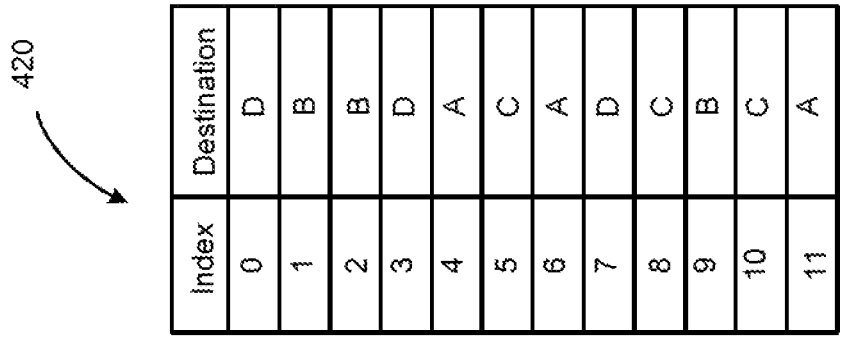
FIGS. 4*a*-4*c* are destination mapping tables in accordance with example embodiments.

FIGS. 4a-4c are example destination mapping tables that may be used by a node in a multi-hop multi-path network, where the node connects to four aggregate members (e.g., next-hops/links) of an aggregation group, where the members are designated {a, b, c, d}. FIG. 4a is a destination mapping table 400 that may be used in a node that does not implement replication or shuffling, as were described above. As may be seen in FIG. 4a, each member {a, b, c, d} of the aggregation group has a single entry in the destination mapping table, and the aggregate members are listed in sequential order in the table 400's entries.

In order to index the table 400 for a given packet, a selected hash value is generated to use in determining an index into the table 400. This index may be determined using Equation 3 presented below:

$$\text{Destination Mapping Table Index} = \text{selected hash value modulo } 4 \quad \text{Equation 3}$$

The modulo operator in Equation 3 corresponds with (is equal to) the number of entries in the destination mapping table, which is four in this situation. In an embodiment that generates a selected hash value that is 8-bits, there are at most 256 possible unique hash values. The modulo operation shown in Equation 3 will then map each of the 256 unique values into 1 of 4 index values uniformly. Selected hash values of (0, 4, 8, ..., 252) will all map to index 0. Similar (count by four) sequences of selected hash values will map, respectively, to indices 1, 2, and 3. The destination (next-hop/link) is then determined by using the determined index to index the destination mapping table. If each node in a multi-hop multi-path network produces the same selected hash value for many different flows and those hash values produce the same index, then those flows may be assigned to the same child node, which may result in an uneven flow distribution.

As was discussed above, correlation between path selection for next-hops/links can be reduced by performing entry replication and entry shuffling for a destination mapping table. FIG. 4b illustrates a destination mapping table 410 that uses a replication factor of three for the node discussed above that is connected with the aggregate group including members {a, b, c, d}. In this situation, each entry in the destination mapping table 410 is replicated three times, as is shown in FIG. 4b, where each aggregate member has three entries in the table 410.

For each packet arriving at the node of this example, a selected hash value may be generated to use in determining an index into the destination mapping table 410. Given the table is now larger by a factor (rf) of the three (as compared to the table 400), the index for the table 410 may be determined using Equation 4 presented below:

$$\text{Destination Mapping Table Index} = \text{selected hash value modulo } 12 \quad \text{Equation 4}$$

The modulo operation of Equation 4 maps each of the 256 possible selected hash values into 1 of 12 index values uniformly.

As shown by the destination mapping table 420 illustrated in FIG. 4c, the sequence of the aggregate members associated with a node may be randomized at each node by shuffling the order in which entries appear (e.g., such as compared to the table 410). Implementing shuffling and replication at each node of a multi-hop multi-path network randomizes the destination output sequences produced at each node and increases the index space into which selected hash values map. Such techniques may increase path flow selection randomness and thus reduce data traffic distribution imbalances in an associated multi-hop multi-path network.

f. Example Methods

Figure 5:
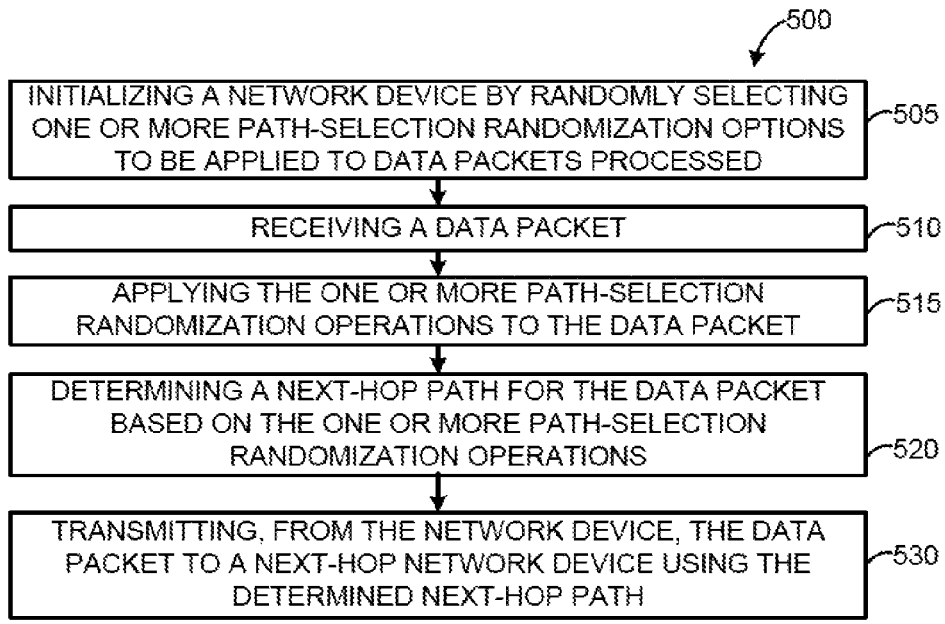
FIG. 5 is a flowchart illustrating a method for node-based path selection randomization in accordance with an example embodiment.

FIG. 5 is a flowchart illustrating a method 500 for node-based path selection randomization in accordance with an example embodiment. The method 500 may be implemented, for example, in the network 100 or the network 200, where any or all of the nodes of those networks may individually implement the method 500. Further, the method 500 may be implemented in the switch element 300 shown in FIG. 3, such as by any, or all of the indicated load balancing points. Of course, the method 500 may implemented in a number of other network devices, such as switches and routers, for example.

The method 500 includes, at block 505, initializing a network device by randomly selecting one or more path-selection randomization options to be applied to data packets processed by the network device. The path-selection randomization options may include one or more of the techniques described above. For example, the randomization options may include combining a hash key with a hash seed, such as in the manners discussed above. Of course, any, or all of the techniques described herein, as well as other path selection randomization techniques may be selected at block 505.

The method 500 further includes, at block 510, receiving a data packet. The data packet may be received via, for example, an ingress port of a network device. The data packet may, however, be received from a number of other sources. The method 500 also includes, at block 515 applying the selected path randomization options to the packet. As discussed above with respect to block 505, applying the one or more path randomization operations to the packet may include applying any, or all of the techniques discussed above. For example, applying the path selection randomization options may include determining a selected hash value from a received hash value, masking a hash key and selecting a hash function.

The method 500, also includes, at block 520, determining a next hop for the data packet based on the one or more path selection randomization options selected at block 505 and applied at block 515. For instance, the next hop may be determined using a destination mapping index table that is implemented using the replication and shuffling techniques discussed above. Of course, any of the approaches for path selection randomization described herein may be implemented in accordance with the method 500 shown. The method 500 still further includes, at block 525, transmitting the data packet to a next-hop network device using the next hop path determined at block 520.

Figure 6:
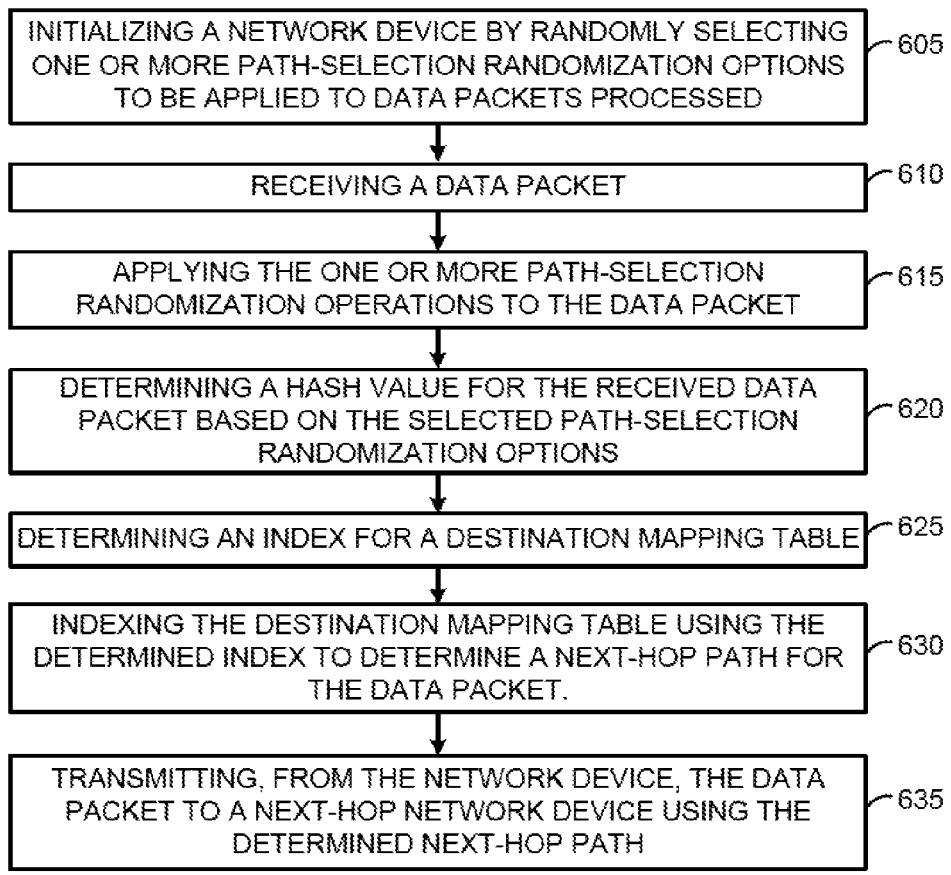
FIG. 6 is a flowchart illustrating another method for node-based path selection randomization in accordance with an example embodiment.

FIG. 6 is a flowchart illustrating another method 600 for node-based path selection randomization in accordance with an example embodiment. As with the method 500, the method 600 may be implemented, for example, in the network 100 or the network 200, where any, or all of the nodes of those networks may implement the method 600. Further, the method 600 may be implemented in the switch element 300 shown in FIG. 3 at any, or all of the indicated load balancing points. Of course, the method 600 may implemented in a number of other network devices, such as switches and routers, for example.

In the method 600, blocks 605, 610 and 615 may be implemented in like fashion as the corresponding blocks 505, 510 and 515 of the method 500 illustrated in FIG. 5. Therefore, for purposes of brevity, those blocks are not described in detail again here.

At block 620, the method 600 includes determining a hash value for the data packet. The hash value at block 620 may be a selected hash value and may be determined using any, or all of the techniques for determining a hash value. Of course, the hash function may be determined in a number of ways at block 620.

The method 600 further includes, at block 625, determining an index for a destination mapping table. The index may be determined, for example, by using one of the Equations 2-4, such as described above. For instance, a table using replication and/or shuffling may be used, as was discussed above and as illustrated in FIG. 4c. At block 630, the method 600 still further includes indexing the destination mapping table using the determined index to determine a next-hop path for the data packet. For the method 600, the index determined at block 630 may be used to determine a next-hop path using a destination mapping table, such as one of the tables 400, 410 and 420 shown in FIGS. 4a-4c, for example. The method 600 still further includes, at block 635, transmitting the data packet to a next-hop network device using the next hop path determined at block 630.

IV. Multistage Path Selection Randomization

As was discussed above, a number of different parameters, such as source and/or destination addresses (e.g., IP addresses or MAC addresses), portions of the source and/or destination addresses, TCP flow parameters, or any set of parameters that are common to a given set of data traffic may define a flow. Flows may be defined differently at each node and may even be defined differently by different portions of a single node. As was also discussed above, balanced flow distribution may be achieved by adding flow-based randomization components to the load balancing mechanism at each node.

Another approach that may be implemented, alone or in combination with one or more of the other techniques described herein, is the use of multi-stage, or cascading, hash functions. Using this approach, multiple hash functions can be implemented in a cascaded fashion in an attempt to randomize next-hop/link selection on a per-flow basis.

Another technique for increasing path selection randomization, in addition to those already discussed and those discussed below, is flow-based hash configuration, which may be implemented in conjunction with multi-stage or cascading hash function as described herein. This approach enables a flow balancer to be configured uniquely, on a per-flow or per-set-of-flows basis, at each node of a multi-hop multi-path network. In fact, different nodes can chose different configurations for the same flow as long as a node consistently uses the same configuration throughout the duration of any flows it is transmitting, which preserves packet order. The following discussion describes these two techniques in further detail.

a. Multi-Stage/Cascading Hash Function Path Selection

Figure 7:
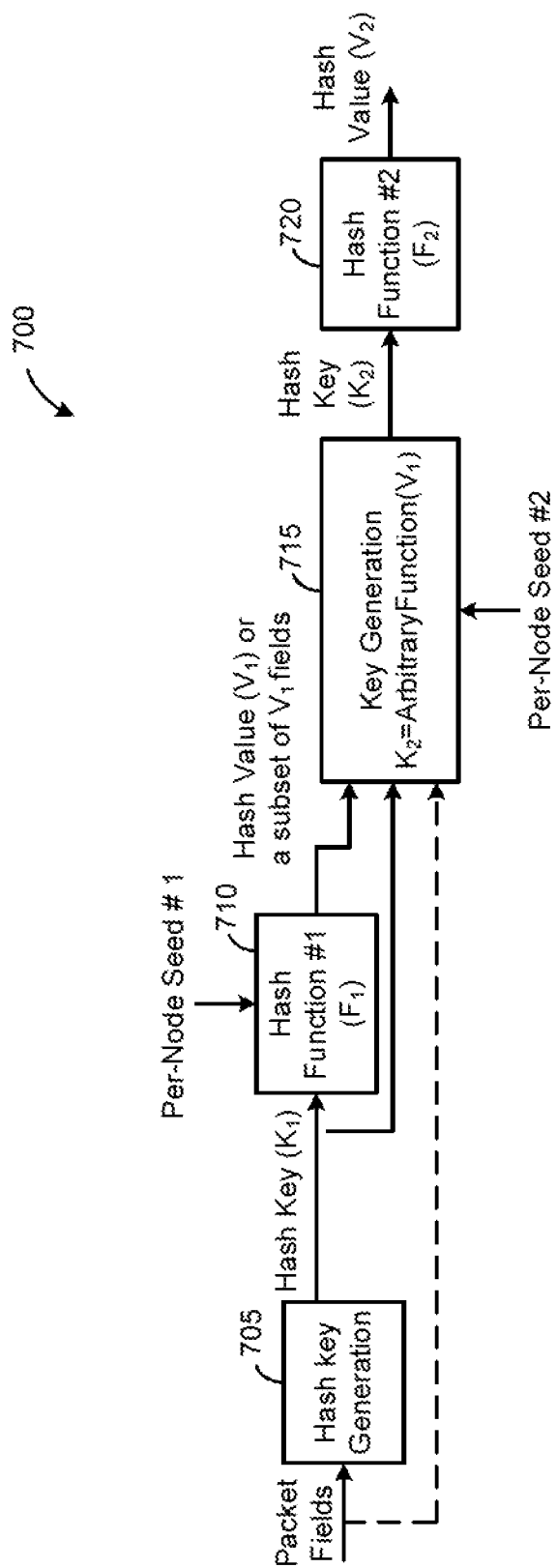
FIG. 7 is a block diagram illustrating an apparatus in accordance with an example embodiment that may be used to implement multi-stage hashing path selection randomization.

FIG. 7 is a block diagram illustrating an apparatus 700 in accordance with an example embodiment that may be used to implement multi-stage hash path selection randomization. The apparatus 700 uses multi-stage/cascading hash functions to increase the entropy, or randomness, in generating a hash value that is used for next-hop/link selection in order to distribute data traffic flows more evenly across available paths in multi-hop multi-path networks.

The apparatus 700 is implemented using 2-stages. As shown in FIG. 7, the apparatus 700 includes a first hash key generator 705, a hash function $F_1$ stage 710, a second hash key generator 715 and a second hash function $F_2$ stage 720. The hash key generation modules 705 and 715 may use the techniques for modifying a hash key that were discussed above to generate the hash keys $K_1$ and $K_2$, in addition to using the specific techniques for hash key generation that are discussed with respect to FIG. 7.

As shown in FIG. 7, the hash key generator 705 generates a first hash key, $K_1$. The hash key $K_1$ may, for example, be generated using a hash key generated from fixed fields of a packet and then modifying the hash key generated from the fixed packet fields using the techniques discussed above. As is also shown in FIG. 7, the first stage hash function $F_1$ stage 710 may compute a hash value, designated $V_1$, using the hash key, $K_1$, the hash value $V_1$ may be computed using the techniques described herein, such as randomly selecting a hash function to use at a given node.

For the second stage hash function $F_2$ stage 720, the hash key, $K_2$, that is input to the second hash function $F_2$ stage 720 could be generated by prepending $V_1$ to $K_1$, which may be done by the hash key generator 715. Using the hash output value $V_1$ from stage 1 rather than a random, non-fixed seed is important, as the hash value $V_1$ is the same for all packets in a flow, which prevents re-ordering when prepending it with the first hash key $K_1$, and it is unique to a given flow, so also improves randomness in the hash values $V_2$ produced across multiple flows.

Prepending the value $V_1$ to a hash key input to the second hash function stage 720 provides many more bits of "random" information as an input for generating a hash value $V_2$, which then translates to more randomness in the output hash value $V_2$. This increased randomness in the output hash value $V_2$ can reduce imbalance and starvation of nodes in large multi-hop networks when the hash value $V_2$ is used to determine next-hops/links for data flows being transmitted by a node of a multi-hop multi-path network, such as using the techniques described above.

In addition to prepending the first stage 710 hash value output $V_1$ to $K_1$ to produce the second hash key $K_2$, the output $V_1$ could also be used to replace select bit fields in the hash key $K_2$ used by the second hash function stage 720. Using this approach, the hash key $K_2$ may be generated directly from fixed data packet fields. In this example, if the bit fields in the hash key $K_2$ selected for replacement are fixed across multiple flows, then this approach may introduce additional randomization into the hashing process. Generally speaking, any arbitrary function that generates a distinct hash key from any combination of (1) the output of a hash function, (2) a hash key, (3) a hash seed, or (4) packet fields to yield a distinct hash key for a separate hash function may be used to generate the hash keys $K_1$ and $K_2$ used in the apparatus 700. Additionally, the techniques discussed above for modifying a hash key, such as prepending, appending or interleaving a random seed selected at initialization or masking a hash key using masked logical or bitwise operations may be used to generate, at least in part, one or both of the hash keys $K_1$ and $K_2$ used in the apparatus 700.

b. Flow-based Hash Configuration

Configuration of hash-based load balancing techniques is generally performed upon powering on a network device implementing such techniques and then left static for the duration of time that the device operates and is processing data traffic. This approach is taken since the performance of hash-based load balancing is sensitive to packet re-ordering. Such re-ordering is prevented by ensuring all packets within a flow hash to the same value (and select the same path) by keeping the hash configuration static during continuous operation. The following discussion describes a technique for hash based load balancing that maintains packet order while also allowing the hash configuration to change dynamically by binding a hash configuration to a flow or set of flows.

In an example embodiment, binding a hash configuration to a flow, or set of flows, is achieved using a Flow Configuration Mapping Table that receives, as its input, a set of bits that are unique to the flow. These bits can be either the packet fields that form the hash key or, if multi-stage hashing is performed, the hash value from a prior stage, as two examples. For the purpose of this discussion, the set of bits used to identify the flow and to index the Flow Configuration Mapping Table is referred to as the FlowID. The FlowID can be made up of select packet fields, the hash value, or other information that can be used to uniquely identify a flow or set of flows. In this example, the Flow Configuration Mapping Table (FCMT) utilizes the FlowID as an index into the table.

In the example embodiment, each FCMT entry contains information that defines how the load balancer should be configured for a given flow or microflow. Configuration options can include defining the hash function to utilize, which set of bits from the hash value to use when performing next-hop/link selection, or how to use each of the hash outputs when utilizing a multi-stage hash. A wide range of configuration options are available with some possible techniques discussed above.

The benefits provided by such an FCMT are more apparent when implemented in a multi-hop multi-path network, because the flow balancing function performed at each node can be unique to the per-flow or per-set-of-flows granularity. This reduces correlation in the next-hop/link selection process between nodes which, in turn, reduces next-hop/link imbalance and starvation/overutilization of links and nodes.

Figure 8:
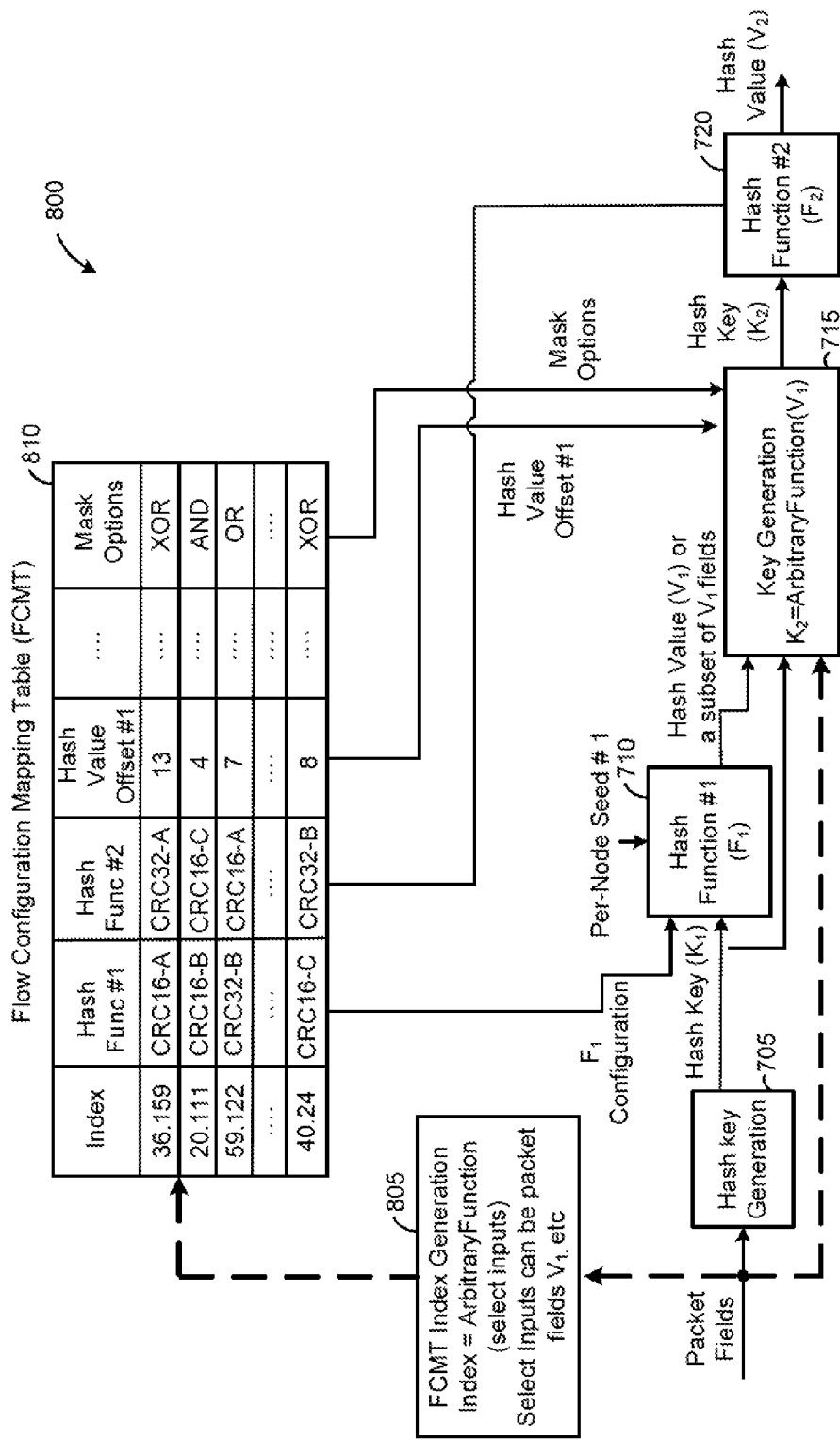
FIG. 8 is a block diagram illustrating another apparatus in accordance with an example embodiment that may be used to implement multi-stage hashing path selection randomization.

FIG. 8 is a block diagram illustrating an apparatus 800 in accordance with an example embodiment, where Flow Based Configuration is implemented in conjunction with the multi-stage hashing path selection randomization apparatus 700 shown in FIG. 7. The elements of the apparatus 700 are referenced with the same reference numbers as in FIG. 7. The elements of the apparatus 700, for the sake of brevity will not be described in detail again here, except to explain the flow based configuration aspects of the apparatus 800.

In the apparatus 800, the hash configuration is determined using a Flow Configuration Mapping Table 810. While the information in the Flow Configuration Mapping Table 810 in the apparatus 800 is shown in one table, in other embodiments, the flow configuration mapping information for each stage could be implemented in a separate, respective table.

In the apparatus 800 shown in FIG. 8, the lower two bytes of a Source IP (SIP) are used to determine the index (FlowID) for each packet. The hash configuration for the flow can then be determined using the Flow Configuration Mapping Table 810 entry corresponding to the identified index. For example, for all packets having a SIP whose lower two bytes are 36.159, the apparatus 800 would be configured such that hash function #1 implemented at hash function stage 710 is CRC16-A, hash function #2 implemented at hash function stage 720 is CRC32-A, with a hash value offset of 13, and will mask using an XOR operation. For all packets having a SIP whose lower two bytes are 59.122, apparatus 800 will be configured such that hash function #1 at hash function stage 710 is CRC32-B, hash function #2 at hash function stage 720 is CRC16-A, with a hash value offset of 7, and will mask using an OR operation.

c. Example Methods

Figure 9:
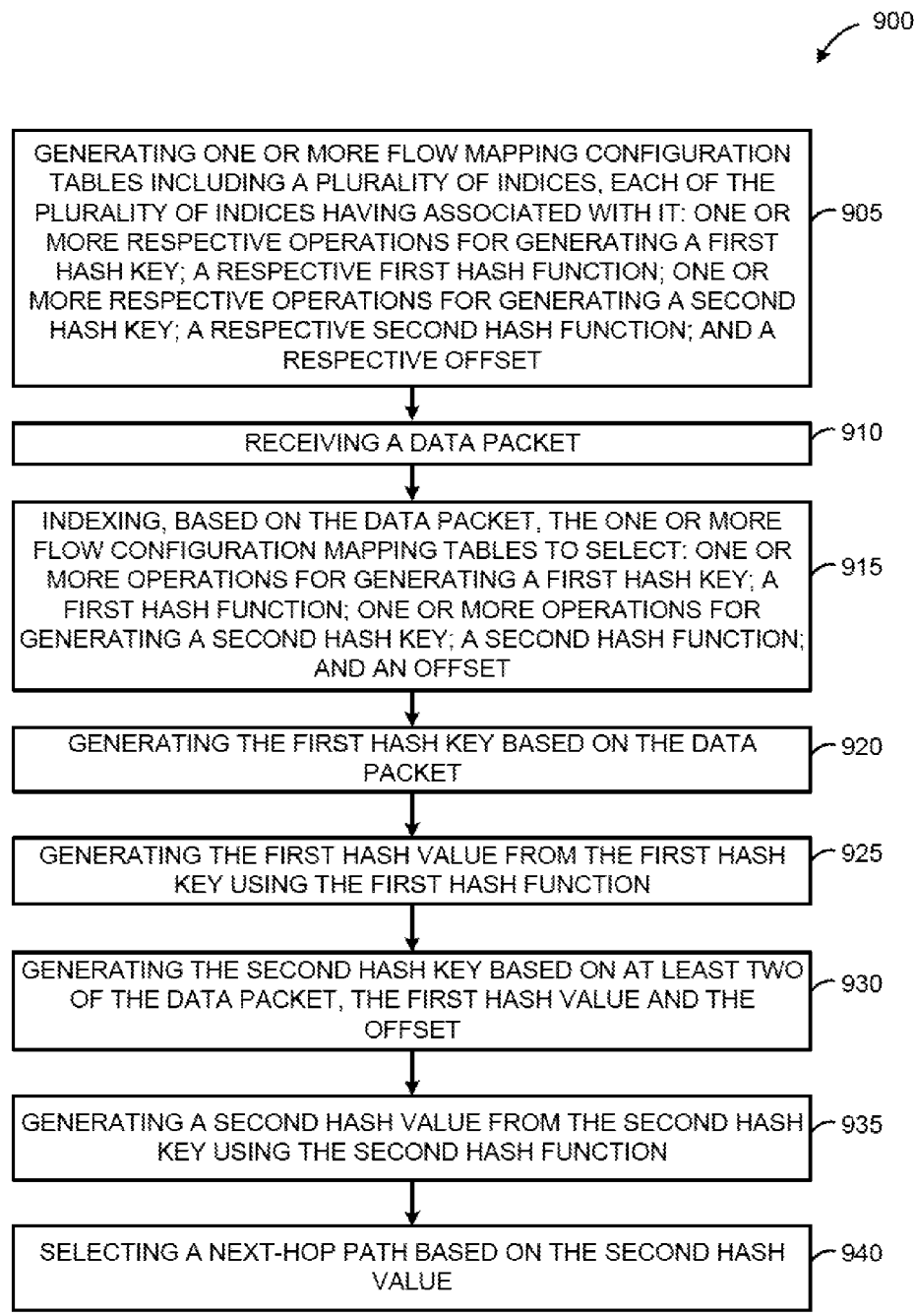
FIG. 9 is a flowchart illustrating a method for multi-stage hashing path selection randomization in accordance with an example embodiment.

FIG. 9 is a flowchart illustrating a method for multi-stage hashing path selection randomization in accordance with an example embodiment. The method 900, at block 905, may include performing an initialization sequence in a network device. The initialization sequence of block 905 may include generating one or more flow mapping configuration tables, such as the FCMT 810 discussed above. In the method 900, the FCMT may include a plurality of indices. Each of the plurality of indices of the FCMT may have associated with it in the FCMT: one or more respective operations for generating a first hash key; a respective first hash function; one or more respective operations for generating a second hash key; a respective second hash function; and a respective offset.

The method 900, at block 910, further includes receiving a data packet. At block 915, the method 900 includes indexing, based on the data packet, the one or more flow configuration mapping tables to select/determine path selection randomization options based on the FCMT. In the method 900, the selected path based randomization options may include one or more operations for generating a first hash key; a first hash function; one or more operations for generating a second hash key; a second hash function; and an offset.

The method 900, at block 920, includes generating the first hash key based on the data packet. One or more operations for generating the first hash key selected at block 915 may be used to generate the hash key at block 920. At block 925, the method 900 includes generating the first hash value from the first hash key using the first hash function. The first hash function selected at block 915 may be used at block 925.

The method 900 at block 930, includes generating the second hash key based on at least two of the data packet, the first hash value and the offset. Also, one or more operations for generating the second hash key selected at block 915 may be used to generate the hash key at block 930. At block 935, the method 900 includes generating the second hash value from the second hash key using the second hash function. The second hash function selected at block 915 may be used at block 935. The method 900, at block 940, then includes selecting a next-hop path based on the second hash value.

As has been previously discussed, the various approaches described herein may be implemented simultaneously. Also, the various approaches for determining a FlowID (index) of a FCMT, selecting a hash function, selecting operations to modify hash keys and selecting operations for modifying an output hash value may be applied in conjunction with the operations of the method 900 (and the other methods and apparatus described herein) as appropriate.

Figure 10:
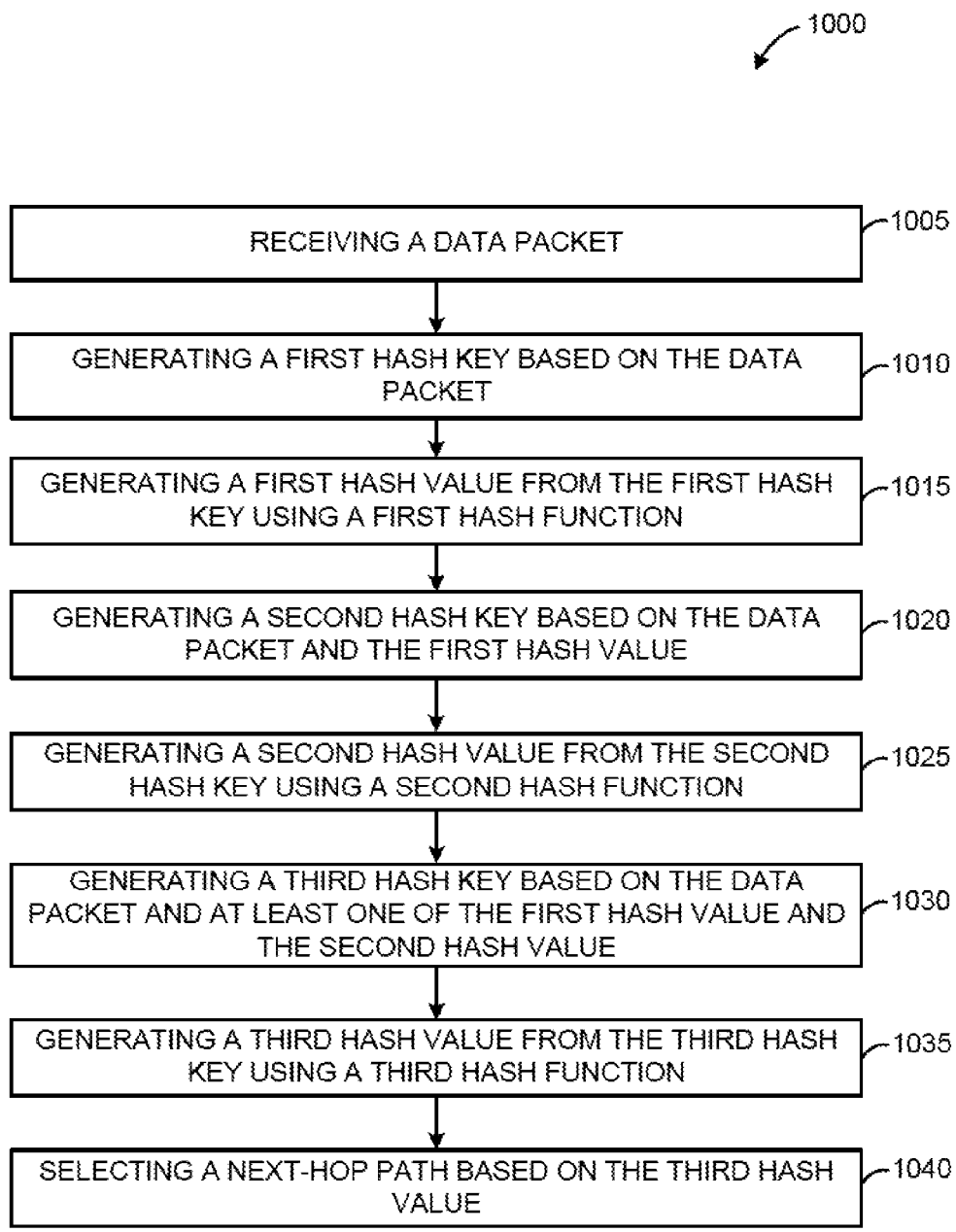
FIG. 10 is a flowchart illustrating another method for multi-stage hashing path selection randomization in accordance with an example embodiment.

FIG. 10 is a flowchart illustrating another method 1000 for multi-stage hashing path selection randomization in accordance with an example embodiment. The method 1000, at block 1005, may include receiving, at a network device, a data packet. The method 1000 may also include, at block 1010, generating a first hash key based on the data packet and, at block 1015, generating a first hash value from the first hash key using a first hash function.

The method 1000 may still further include, at block 1020, generating a second hash key based on the data packet and the first hash value and, at block 1025, generating a second hash value from the second hash key using a second hash function. The example method may also further include, at block 1030, generating a third hash key based on the data packet and at least one of the first hash and the second hash value, and, at block 1035, generating a third hash value from the third hash key using a third hash function. The example method may also further include, at block 1040, selecting a next-hop path/link based on the third hash value. In other embodiments, an arbitrary number of hash keys and hash functions may be used. Also, the method 900 may be implemented using any of the approaches for the various operations described herein, as well as being combined with other techniques described herein, as appropriate.

A possible variation on the FCMT techniques described in this disclosure is to maintain additional information to identify a given flow (i.e. Flow ID) that is not discussed herein. Another possible variation may be to use a look up table to produce a unique value for use in next-hop/link selection, rather than use a traditional hash function.

V. Parallel Hash Function Randomization

Figure 11:
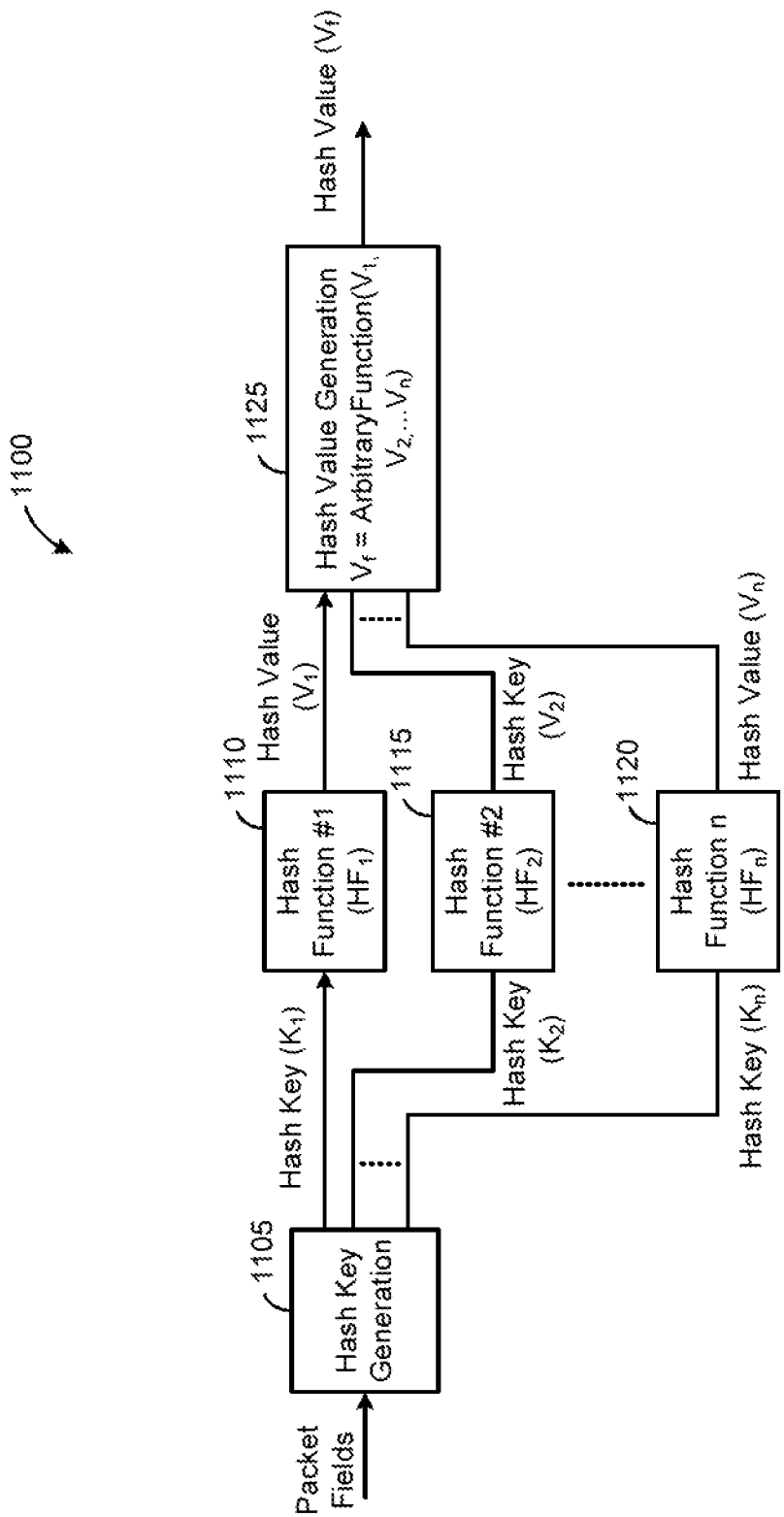
FIG. 11 is a block diagram illustrating an apparatus in accordance with an example embodiment that may be used to implement parallel-stage hashing path selection randomization.

FIG. 11 is a block diagram illustrating an apparatus 1100 in accordance with an example embodiment that may be used to implement parallel-stage hashing path selection randomization. The apparatus 1110 includes a hash key generator 1105. The hash key generator 1105 may generate multiple hash keys using a number of techniques, including the techniques for hash key generation and modification that are described herein.

The apparatus 1100 also includes three parallel hash function blocks 1110, 1115 and 1120. The parallel hash function blocks 1110, 1115 and 1120 receive hash keys (respectively $K_1$, $K_2$ and $K_3$) from the hash key generator 1105. The hash function blocks 1110, 1115 and 1120 then generate hash values (respectively $V_1$, $V_2$ and $V_3$) based on the hash keys $K_1$, $K_2$ and $K_3$. As previously discussed herein, the randomization techniques described herein may be applied to the blocks of the apparatus 1100 as appropriate. For instance the hash functions for each of the hash function blocks 1110, 1115 and 1120 may be randomly selected, such as in the manners described above, or in some other fashion.

The hash values $V_1$, $V_2$ and $V_3$ may then be provided to a hash value generator 1125, which generates a hash value output value $V_f$ based on the three parallel produced hash values $V_1$, $V_2$ and $V_3$. As the apparatus 1100 may operate using any of the techniques disclosed herein, as appropriate, in one embodiment, the hash key generator 1105 may, at initialization, select one or more operations that are used to modify a hash seed that only includes fixed fields of an incoming data packet. The operations may be the same for each of the hash keys generated or, alternatively, may be different operations. Of course other techniques, such as those described herein, may be implemented in the apparatus 1100.

The hash value generator 1125 may use a number of techniques for combining the hash values $V_1$, $V_2$ and $V_3$ received from the parallel hash function blocks 1110, 1115 and 1120. For instance the output values $V_1$, $V_2$ and $V_3$ of the of the multiple parallel hash function blocks 1110, 1115 and 1120 may be combined to produce a single hash value ($V_f$), using a number of techniques, such as those discussed herein. For instance, as one example, the hash values $V_1$, $V_2$ and $V_3$ may be combined to produce the hash value $V_f$ using an XOR function. In such an approach, the hash value $V_f$ may be produced by performing an XOR function with the three hash values $V_1$, $V_2$ and $V_3$ as inputs and $V_f$ as the output. For example, in this situation, the hash value $V_f$ may be determined by the logical expression $V_f = (V_1)$ XOR $(V_2)$ XOR $(V_3)$.

Another approach may be to interleave the hash values $V_1$, $V_2$ and $V_3$ to produce the hash value $V_f$ using the logical expression $V_f = concat(V_1[15:8], V_2[7:4], V_3[3:0])$, where the bits positions of the interleaved segments of each input hash value match their original bit positions before concatenation. Still another approach would be to produce the hash value $V_f$ by interleaving segments of the hash values $V_1$, $V_2$ and $V_3$ but shuffling the order of the segments so that the original bit positions from the hash values $V_1$, $V_2$ and $V_3$ do not match the bit positions in the hash value $V_f$. Such an interleaving with shuffling operation may be implemented using a logical expression, such as $V_f = concat(V_1[7:0], V_2[11:8], V_3[16:12])$, for example.

Figure 12:
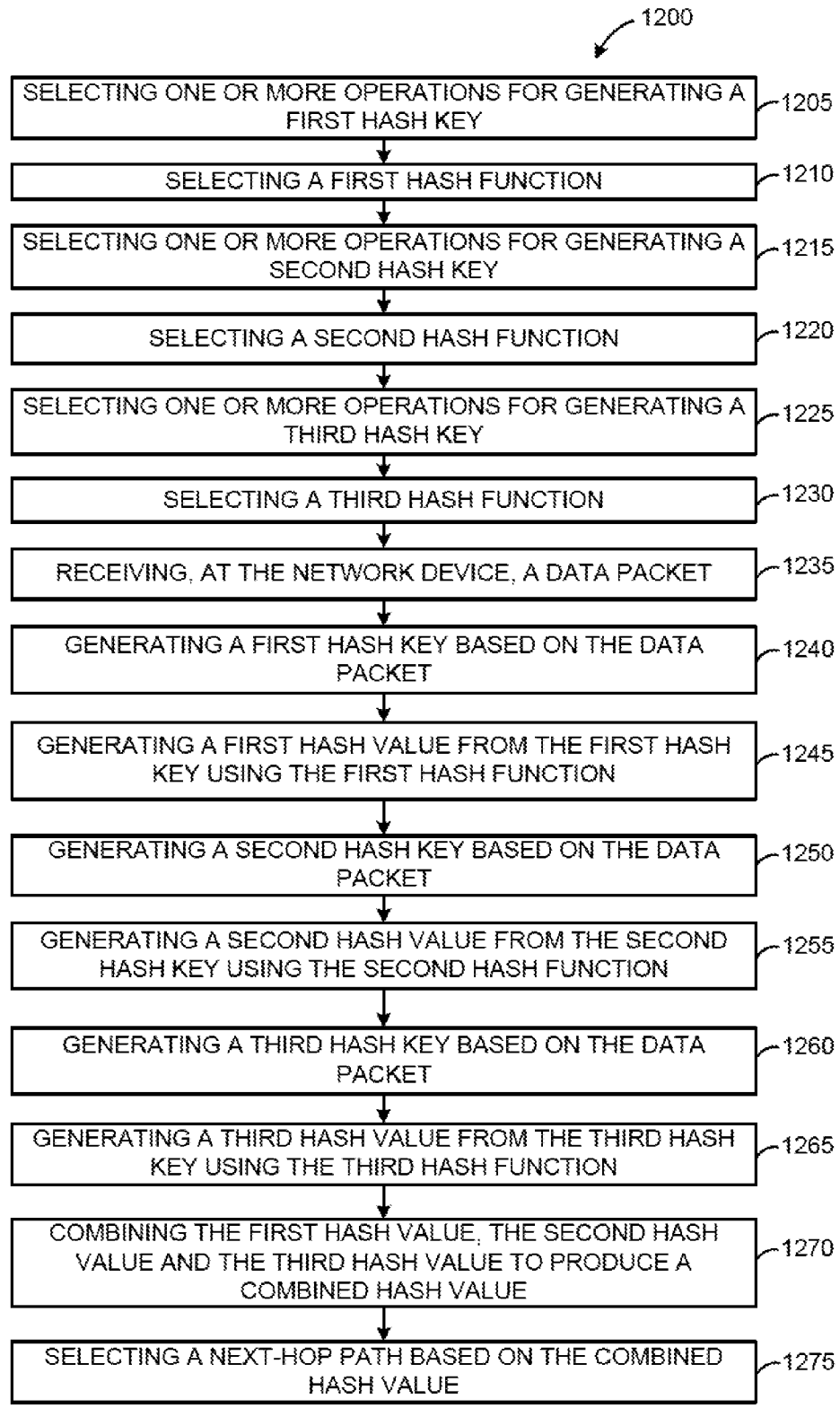
FIG. 12 is a flowchart illustrating a method for parallel-stage hashing path selection randomization in accordance with an example embodiment.

FIG. 12 is a flowchart illustrating a method 1200 for parallel-stage hashing path selection randomization in accordance with an example embodiment. The method 1200 may include, at blocks 1205-1230 performing, by the network device, an initialization sequence. The initialization sequence may include, at block 1205, selecting one or more operations for generating a first hash key and, at block 1210, selecting the first hash function from a plurality of hash functions. The initialization sequence, at block 1215, may also include selecting operations for generating a second hash key and, at block 1220, selecting the second hash function from the plurality of hash functions. The initialization sequence may still further include, at block 1225, selecting operations for generating a third hash key and, at block 1230, selecting the third hash function from the plurality of hash functions.

At block 1235, the method 1200 may include receiving, e.g., at the network device, a data packet and, at block 1240, generating a first hash key based on the select packet fields. The method 1200 may also include, at block 1245, generating a first hash value from the first hash key using a first hash function. The example method may still further include, at block 1250, generating a second hash key based on the data packet (and modification operations) and, at block 1255, generating a second hash value from the second hash key using a second hash function (e.g., in parallel with generating the first hash key and generating the first hash value).

The example method may further include, at block 1260, generating a third hash key based on select packet fields and, at block 1265, generating a third hash value from the third hash key using a third hash function (e.g., in parallel with generating the first hash key, generating the first hash value, generating the second hash key and generating the second hash value). As shown in FIG. 12, the method 1200 may still further include, at block 1270, combining the first hash value, the second hash value and the third hash value to produce a combined hash value and, at block 1275, selecting a next-hop/link based on the combined hash value. The next-hop/link may be selected, for example, using techniques described herein.

In such example method, the first hash function, the second hash function and the third hash function may be different hash functions. Further, in such example methods, the first hash key, the second hash key and the third hash key may be different hash keys.

In the example method, combining the first hash value, the second hash value and the third hash value may include combining the first hash value, the second hash value and the third hash value using an arbitrary function. The arbitrary function may be one of an XOR function, and OR function, an AND function and a NAND function, or any combination of these functions and other functions, such as mathematical functions.

Alternatively, in the example methods, combining the first hash value, the second hash value and the third hash value may include interleaving bits of the first hash value, bits of the second hash value and bits of the third hash value. In the combined hash value, the interleaved bits of the first hash value, the interleaved bits of the second hash and the interleaved bits of the third hash value may occupy same bit positions as compared to their respective bit positions in the first hash value, the second hash value and the third hash value. Of course, fewer or more hash values may be generated and/or interleaved/combined.

As another alternative, in the example methods, combining the first hash value, the second hash value and the third hash value may comprise interleaving bits of the first hash value, bits of the second hash value and bits of the third hash value. In the combined hash value, the interleaved bits of the first hash value, the interleaved bits of the second hash value and the interleaved bits of the third hash value may occupy different bit positions as compared to their respective bit positions in the first hash value, the second hash value and the third hash value. Again, fewer or more hash values may be generated and/or interleaved/combined. A possible variations on the parallel hash path selection techniques described in this disclosure may utilize a logical operation (AND, OR, etc.) for combining hash outputs not listed in the description.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the embodiments of the invention.

What is claimed is:

1. A method for processing packet data in a network device, the method comprising:
  receiving, at the network device, a data packet;
  generating a first hash key from the data packet;
  generating a first hash value from the first hash key using a first hash function;
  generating a second hash key from the data packet and the first hash value;
  generating a second hash value from the second hash key using a second hash function;
  selecting a next-hop path based on the second hash value;
  determining an index to a flow configuration mapping table based on the data packet; and
  indexing the flow configuration mapping table using the index to:
    select one or more operations for generating the first hash key;
    select the first hash function;

select one or more operations for generating the second hash key; and
select the second hash function.

2. The method of claim 1, wherein the first hash function and the second hash function are different hash functions.

3. The method of claim 1, wherein generating the second hash key comprises prepending the first hash value to the first hash key.

4. The method of claim 1, wherein generating the second hash key comprises appending the first hash value to the first hash key.

5. The method of claim 1, wherein generating the second hash key comprises interleaving the first hash value with the first hash key.

6. The method of claim 1, wherein the first hash function is one of a 16-bit cyclic redundancy check (CRC16) hash function, a 32-bit cyclic redundancy check (CRC32) hash function, an exclusive-OR (XOR) hash function and a Pearson's hash function.

7. The method of claim 1, wherein the second hash function is one of a 16-bit cyclic redundancy check (CRC16) hash function, a 32-bit cyclic redundancy check (CRC32) hash function, an exclusive-OR (XOR) hash function and a Pearson's hash function.

8. The method of claim 1, further comprising:
indexing the flow configuration mapping table using the index to select an offset; and
generating the second hash key based on the offset and the first hash value.

9. The method of claim 1, further comprising, prior to receiving the data packet:
performing, by the network device, an initialization sequence, the initialization sequence comprising:
selecting one or more operations for generating the first hash key;
selecting the first hash function;
selecting operations for generating the second hash key; and
selecting the second hash function.

10. The method of claim 1, further comprising:
prior to receiving the data packet:
generating one or more flow mapping configuration tables including a plurality of indices, each of the plurality of indices having associated with it:
one or more respective operations for generating the first hash key;
a respective first hash function;
one or more respective operations for generating the second hash key; and
a respective second hash function; and
after receiving the data packet, indexing, based on the data packet, the one or more flow configuration mapping tables to select:
one or more operations for generating the first hash key;
the first hash function;
one or more operations for generating the second hash key; and
the second hash function.

11. A network device comprising a non-transitory machine readable storage medium having instructions stored thereon, wherein the instructions, when executed by the network device, cause the network device to:
receive a data packet;
generate a first hash key from the data packet;
generate a first hash value from the first hash key using a first hash function;
generate a second hash key from the data packet and the first hash value;
generate a second hash value from the second hash key using a second hash function;
select a next-hop path based on the second hash value;
determine an index to a flow configuration mapping table based on the data packet; and
index the flow configuration mapping table using the index to:
select one or more operations for generating the first hash key;
select the first hash function;
select one or more operations for generating the second hash key; and
select the second hash function.

12. The network device of claim 11, wherein the instructions, when executed by the network device, further cause the network device to:
index the flow configuration mapping table using the index to:
select an offset; and
generate the second hash key based on the offset the first hash value.

13. The network device of claim 11, wherein the instructions, when executed by the network device, further cause the network device to:
prior to receiving the data packet:
generate one or more flow mapping configuration tables including a plurality of respective indices, each of the plurality of indices having associated with it:
one or more respective operations for generating the first hash key;
a respective first hash function;
one or more respective operations for generating the second hash key; and
a respective second hash function; and
after receiving the data packet, index, based on the data packet, the one or more flow configuration mapping tables to select:
one or more operations for generating the first hash key;
the first hash function;
one or more operations for generating the second hash key; and
the second hash function.

14. The network device of claim 11, wherein the instructions, when executed by the network device, further cause the network device to:
select one or more operations for generating the first hash key;
select the first hash function;
select one ore more operations for generating the second hash key; and
select the second hash function.

15. A method for processing packet data in a network device, the method comprising:
receiving, at the network device, a data packet;
generating a first hash key from the data packet;
generating a first hash value from the first hash key using a first hash function;
generating a second hash key from the data packet and the first hash value;
generating a second hash value from the second hash key using a second hash function;
generating a third hash key from the data packet and at least one of the first hash value and the second hash value;
generating a third hash value from the third hash key using a third hash function;

selecting a next-hop path based on the third hash value;
determining an index to a flow configuration mapping table based on the data packet; and
indexing the flow configuration mapping table using the index to:
  select one or more operations for generating the first hash key;
  select the first hash function;
  select one or more operations for generating the second hash key; and
  select the second hash function.

16. The method of claim 15, further comprising indexing the flow configuration mapping table using the index to:
  select one or more operations for generating the third hash key; and
  select the third hash function.

17. The method of claim 15, further comprising:
  select one or more operations for generating the first hash key;
  select the first hash function;
  select one or more operations for generating the second hash key;
  select the second hash function;
  select one or more operations for generating the third hash key; and
  select the third hash function.

18. The method of claim 16, further comprising:
prior to receiving the data packet:
generating one or more flow mapping configuration tables including a plurality of indices, each of the plurality of indices having associated with it:
  one or more respective operations for generating the first hash key;
  a respective first hash function;
  one or more respective operations for generating the second hash key;
  a respective second hash function;
  one or more respective operations for generating the third hash key; and
  a respective third hash function; and
after receiving the data packet, indexing, based on the data packet, the one or more flow configuration mapping tables to select:
one or more operations for generating the first hash key;
the first hash function;
one or more operations for generating the second hash key;
the second hash function;
one or more operations for generating the third hash key; and
the third hash function.

* * * * *